United States Patent [19]

Aoshima et al.

[11] Patent Number: 5,082,340
[45] Date of Patent: Jan. 21, 1992

[54] WAVELENGTH CONVERTING DEVICE

[75] Inventors: Shinichiro Aoshima; Hironori Takahashi; Yutaka Tsuchiya, all of Shizuoka, Japan

[73] Assignee: Hamamatsu Photonics K. K., Shizuoka, Japan

[21] Appl. No.: 515,848

[22] Filed: Apr. 27, 1990

[30] Foreign Application Priority Data

Apr. 28, 1989 [JP] Japan .................. 1-110293

[51] Int. Cl.$^5$ ............................................. G02F 1/37
[52] U.S. Cl. .................................. 359/328; 359/332; 385/27; 385/122; 385/129
[58] Field of Search ............... 350/96.12, 96.13, 96.15, 350/96.18, 96.29; 307/425-430

[56] References Cited

U.S. PATENT DOCUMENTS

| | | | |
|---|---|---|---|
| 4,515,429 | 5/1985 | Smith et al. | 350/96.13 |
| 4,830,447 | 5/1989 | Kamiyama et al. | 350/96.12 |
| 4,838,634 | 6/1989 | Bennion et al. | 350/96.12 |
| 4,852,961 | 8/1989 | Yamamoto et al. | 350/96.13 X |
| 4,874,221 | 10/1989 | Ohsawa | 350/96.29 |
| 4,892,375 | 1/1990 | Chikuma et al. | 350/96.18 |
| 4,923,277 | 5/1990 | Okazaki et al. | 350/96.29 |
| 4,925,263 | 5/1990 | Sanford et al. | 350/96.12 |

FOREIGN PATENT DOCUMENTS

| | | |
|---|---|---|
| 18934 | 1/1986 | Japan . |
| 72222 | 4/1986 | Japan . |
| 189524 | 8/1986 | Japan . |
| 239231 | 10/1986 | Japan . |
| 14124 | 1/1987 | Japan . |
| 121829 | 5/1988 | Japan . |
| 269129 | 11/1988 | Japan . |
| 269130 | 11/1988 | Japan . |
| 269131 | 11/1988 | Japan . |
| 269132 | 11/1988 | Japan . |
| 304686 | 12/1988 | Japan . |

OTHER PUBLICATIONS

Stanford, N. A. et al., "WM47 Optimization of the Cerenkov Sum-Frequency Generation in Proton-Exchanged LiNbO3 Channel Waveguides", Cleo '88/Wed. Poster/238.
Tien, P. K. et al., "Optical Second Harmonic Generation in Form of Coherent Cerenkov Radiation From a Thin-Film Waveguide", vol. 17, No. 10, 15 Nov. 1970, pp. 447–450.
Bor-Uei Chen et al., "CW Harmonic Generation in the UV Using a Thin-Film Waveguide on a Nonlinear Substrate", Applied Physics Letters, vol. 25, No. 9, 1 Nov. 1974, pp. 495–498.
Sanford, N. A. et al., "Direct Measurement of Effective Indices of Guided Modes in LiNbO3 Waveguides Using the Cerenkov Second Harmonic", Jun. 1987/vol. 12, No. 6/Optics Letters, pp. 445–447.
T. Taniuchi et al., "Second Harmonic Generation in Proton Exchanged Guides", SPIE, vol. 864, Advanced Optoelectronic Technology (1987), pp. 36–41.
Hano, K. et al., "Optical Second-Harmonic Generation by Guided-Radiation Mode Coupling in a Thin-Film Optical-Waveguide", pp. 27–39.
Taniuchi, T. et al., "Second Harmonic Generation with GaAs Laser Diode in Proton-Exchanged LiNbO3 Waveguides", ECOC '86, pp. 171–174.
Ohtaka, M. et al., "Difference-Frequency Generation of Infrared Waves Using AlGaAs Nonlinear Waveguides", pp. 1–8.
Taniuchi, T. et al., "Second Harmonic Generation with Semiconductor", pp. 1637(49)–1641(53).

*Primary Examiner*—John D. Lee
*Attorney, Agent, or Firm*—Finnegan, Henderson, Farabow, Garrett and Dunner

[57] ABSTRACT

In a wavelength converting device including a light waveguide made of nonlinear optical material and outputting Cherenkov light, a reflecting mirror for reflecting guided light is provided at the end of the light waveguide. The light waveguide may include a light introducing portion and a curved light waveguide smoothly coupled with the light introducing portion. The light waveguide may have a Y-shaped structure including two light introducing portions partially parallel to each other, a junction part at which the two light introducing portions are smoothly joined together, and a linear light generating portion coupled with the junction part.

24 Claims, 5 Drawing Sheets

WAVELENGTH CONVERTING DEVICE

BACKGROUND OF THE INVENTION

The present invention relates to a wavelength converting device, and more particularly to a wavelength converting device which includes a light waveguide made of nonlinear material and generates SHG light or sum and difference frequency light.

There has been known a wavelength converting device in which Cherenkov radiation light is produced from a light waveguide formed on a $LiNbO_3$ crystal by a proton exchange method.

In this device, second harmonic generation (SHG) light in the form of Cherenkov radiation can be obtained with a converting efficiency of 1% when a semiconductor laser beam is incident on the light waveguide.

The wavelength converting device with a similar light waveguide can produce sum and difference (sum/difference) frequency light in the form of Cherenkov radiation. For example, it is known that from two incident light beams having wavelengths of $\lambda_1$ of 1.06 μm and $\lambda_2$ of 0.824 μm, the device produces sum frequency light having wavelength $\lambda_3$ of 0.463 μm, where $1/\lambda_1 + 1/\lambda_2 = 1/\lambda_3$.

In such wavelength converting devices, much of the light introduced into the light waveguide is output with the wavelength remaining unconverted, so that the conversion efficiency is low.

To improve the conversion efficiency, it is necessary to elongate an optical path of the light waveguide. However, this leads to an elongation of the device itself, making the device bulky.

Further, in the above wavelength converting devices, the output light is obtained only in one direction, and not obtained in the other directions.

Furthermore, in the sum/difference frequency generating device, a wave combining means such as a dichroic mirror must be provided prior to the light waveguide in order to introduce two input light beams of wavelengths $\lambda_1$ and $\lambda_2$, since the light waveguide is rectilinear in shape. In the case where two light beams of $\lambda_1$ and $\lambda_2$ are led through optical fibers to the device, the light beams emanating from the optical fibers are first collimated by objectives, the collimated light beams are combined and then converged by an objective, and are finally led to the light waveguide. Practically, it is very difficult to make the optical axis of the $\lambda_1$ light coincident with that of the $\lambda_2$ light. Further, the device becomes complicated and bulky.

SUMMARY OF THE INVENTION

Accordingly, an object of the present invention is to provide a wavelength converting device in which an optical path, i.e., interactive length can be elongated without increasing the size of the device, thereby realizing an effective conversion of the wavelength of light.

Another object of the present invention is to provide a wavelength converting device in which wavelength-converted light can be output in a plurality of directions.

Yet another object of the present invention is to provide a wavelength converting device in which two light beams of different wavelengths can be introduced from optical fibers directly to a light waveguide, without employing a wave combining means such as a dichroic mirror.

According to one aspect of the present invention, there is provided a wavelength converting device including a light waveguide made of nonlinear optical material, in which reflecting means for reflecting guided light is provided at the end face of the light waveguide.

In the wavelength converting device, the light waveguide may be a linear light waveguide, and the reflecting means may be provided at least at one of the two end faces of the linear light waveguide.

Further, the light waveguide may be a ring-like light waveguide including a plurality of light waveguides coupled one to another by the reflecting means.

The light waveguide may have a generally Y-shaped structure including two light introducing portions partially parallel to each other, a junction part at which the two light introducing portions are smoothly joined together, a linear light generating portion coupled with the junction part, and the reflecting means is disposed at the end face of the light generating portion.

In the above wavelength converting device, at least one of the reflecting means may be a total reflection mirror.

Also in the above wavelength converting device, at least one of the reflecting means may be a dielectric multi-layer mirror.

The wavelength converting device may operate as an SHG light generating device.

The wavelength converting device may operate as a sum and difference frequency light generating device.

The wavelength converting device may further include directing means for directing wavelength-converted output light beams to one direction.

According to another aspect of the present invention, there is provided a wavelength converting device including a light waveguide made of nonlinear optical material, in which the light waveguide includes a light introducing portion and a curved light waveguide smoothly coupled with the light introducing portion.

The curved light waveguide may have the shape of a closed circle.

The curved light waveguide may be spiral in shape, and, furthermore, reflecting means for reflecting propagating guided light may be provided at the end face of the spiral light waveguide located opposite to the light introducing portion.

The light introducing portion may have a generally Y-shaped structure including two sub-introducing portions partially parallel to each other, a junction part at which the two sub-intruducing portions are smoothly joined together, and a connecting portion one end of which is coupled with the junction part and the other end of which is tangentially connected to the curved light waveguide.

In the above wavelength converting device, a plurality of light introducing portions may be provided, and the light introducing portion may be tangentially connected to the curved light waveguide at least at each connecting point of a curved poriton of the curved waveguide.

An input end of the light introducing portion may be coupled with an optical fiber for introducing an input light beam.

According to yet another aspect of the present invention, there is provided a wavelength converting device including a light waveguide made of nonlinear optical material, in which the light waveguide has a generally Y-shaped structure including two light introducing portions partially parallel to each other, a junction part at which the two light introducing portions are smoothly joined together, and a linear light generating portion coupled with the junction part.

In the wavelength converting device, two optical fibers may be coupled with input ends of the respective light introducing portions.

According to the present invention, since the reflecting means for reflecting guided light is provided at the end face of the light waveguide, SHG light is emitted obliquely downward through the substrate on the basis of both the guided light beams before and after the reflection by the reflecting means. Therefore, the interactive path is substantially doubled in length. This provides effecient conversion of the wavelength of light.

If the actual device length is doubled, a propagation distance of the SHG light in the substrate is also doubled and scattering of the SHG light in the substrate is increased. In the invention, however, since the device size is not changed, there will not occur increase of such scattering.

Also in the case of producing sum/difference frequency light, the conversion efficiency is improved because the length of the substantial interactive path is doubled. Further, the output light is produced in two directions.

When the light waveguide is shaped like a ring, the interactive length can be further elongated. Accordingly, good conversion efficiency is secured without increasing the device size. The converted light can be produced in many directions.

In the case of the light waveguide having a generally Y-shaped structure including two light introducing portions partially parallel to each other, there is no need of using wave combining means, such as a dichroic mirror, outside the light waveguide. Accordingly, two different light beams can be introduced into the light waveguide with a simple structure.

In the case where the light waveguide is composed of the light introducing portion and the circular or spiral curved light waveguide smoothly connected to the light introducing portion, the interactive path can be remarkably elongated and the conversion efficiency is improved accordingly. The wavelength-converted light can be produced in many directions. If a plurality of light introducing portions are used, a high power output is secured.

When light beams are led from the optical fibers to the light waveguide, those input light beams can be combined by merely connecting the output ends of the optical fibers to the respective light introducing portions of the light waveguide, not using an objective or the like.

Other objects, features, and advantages of the present invention will be apparent when carefully reading the detailed description to follow in connection with the accompanying drawings.

DETAILED DESCRIPTION OF THE PREFERRED EMBODIMENTS

Preferred embodiments of a wavelength converting device according to the present invention will be described with reference to the accompanying drawings.

Figure 1:
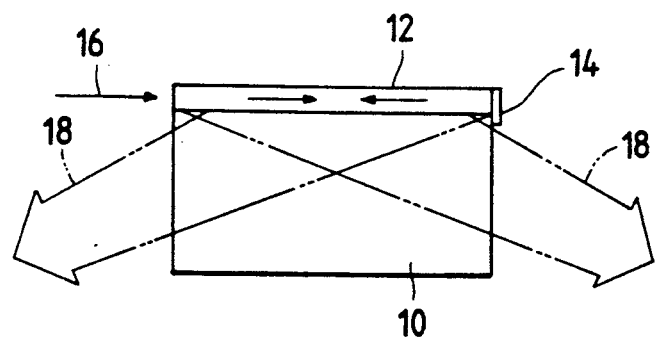
FIG. 1 is a sectional view showing a first embodiment of a wavelength converting device according to the present invention.

A first embodiment of a wavelength converting device according to the present invention as shown in FIG. 1 will first be described.

As shown, a light waveguide 12 is formed on a substrate 10 made of $LiNbO_3$ crystal by a proton exchange process. A total reflection mirror 14 made of metal is formed on one of the end faces of the light waveguide 12 by a vacuum deposition process, for example. In the wavelength converting device thus constructed, the light waveguide 12 acts as a wavelength converting element for emitting Cherenkov radiation light.

In the instant embodiment, an incident light beam 16 is coaxially introduced into the linear light waveguide 12 from the end face opposite to the total reflection mirror 14. The incident light propagates through the light waveguide 12 and reaches the total reflection mirror 14. The light beam is then reflected by the mirror 14 and propagates again through the light waveguide 12. During the course of the propagation of the guided light, SHG light 18 is emitted obliquely downward in two directions through the substrate 10.

With such a structure, the length of an interactive path is doubled, thereby to improve wavelength conversion efficiency.

If the actual device length is doubled, the propagation distance of the SHG light in the substrate 10 is also doubled and scattering of the SHG light in the substrate 10 is increased. The instant embodiment has an advantage that, since the device size is not changed, there will not occur increase of such scattering.

Figure 2:
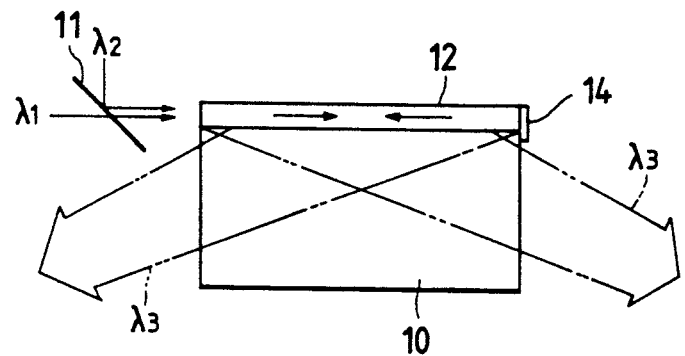
FIG. 2 is a sectional view showing an embodiment of the present invention when the wavelength converting device of FIG. 1 is operated as a sum/difference frequency generating device.

To generate light of a sum/difference frequency by the wavelength converting device of the first embodiment, light beams of wavelength $\lambda_1$ and $\lambda_2$ are introduced into the light waveguide 12 by using a dichroic mirror 11, as shown in FIG. 2. Then, sum/difference frequency light of wavelength $\lambda_3$ is generated in two directions, as in the case of the SHG light 18 of FIG. 1. The dichroic mirror 11 transmits the light beam of wavelength $\lambda_1$, but reflects the light beam of wavelength $\lambda_2$.

Also in the generation of the sum/difference frequency light, the substantial interactive length is doubled, and hence the wavelength conversion efficiency is improved.

Figure 3:
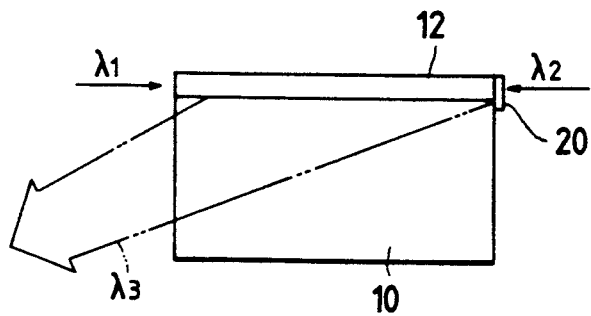
FIGS. 3 to 6 are sectional views showing second to fifth embodiments of the present invention.

A second embodiment of a wavelength converting device according to the present invention as shown in FIG. 3 will be described.

The second embodiment employs a spectral mirror, i.e., a dielectric multi-layer mirror 20, in place of the the total reflection mirror 14 in the first embodiment. The dielectric multi-layer mirror 20 reflects the light beam of wavelength $\lambda_1$, but transmits the light beam of wavelength $\lambda_2$.

In the second embodiment, the light beam of wavelength $\lambda_2$ is introduced into the light waveguide 12 from the end face on which the multi-layer mirror 20 is formed, while the light beam of wavelength $\lambda_1$ is introduced into the light waveguide 12 from the end face opposite to the former. Then, a light beam of the sum/difference frequency, or wavelength $\lambda_3$, is emitted obliquely downward and in the opposite direction to the light beam $\lambda_1$ through the substrate 10.

Figure 4:
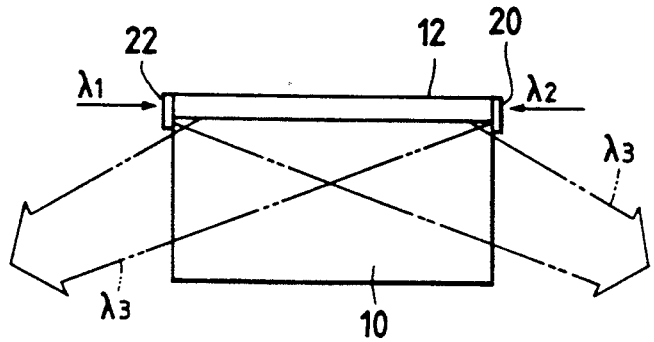

A third embodiment of a wavelength converting device according to the present invention as shown in FIG. 4 will be described.

In the third embodiment, dielectric multi-layer mirrors 20 and 22 are formed on both end faces of the light waveguide 12 of the first embodiment. The mirror 20 reflects the light beam $\lambda_1$, but transmits the light beam $\lambda_2$, as in the above case. The mirror 22 transmits the light beam $\lambda_1$, but reflects the light beam $\lambda_2$.

In the present embodiment, the sum/difference frequency light beam of wavelength $\lambda_3$ is emitted in two directions, as in the device of FIG. 2.

In the first and third embodiments, the SHG light beams 18 or the sum/difference frequency light beams of wavelength $\lambda_3$ are emitted in two directions. However, the two beams are likely to scatter. To lead these output light beams in the same direction from the light waveguide, total reflection mirrors are used, as in a fourth or fifth embodiment shown in FIG. 5 or 6.

Figure 5:
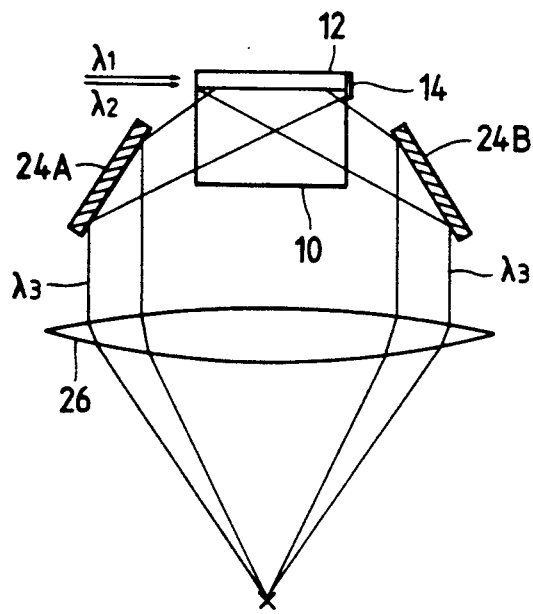

In the fourth embodiment shown in FIG. 5, a couple of total reflection mirrors 24A and 24B are provided. The SHG light beams or the light beams of wavelength $\lambda_3$ that have been output in two directions, are reflected by these mirrors so as to become parallel to each other after the reflection. A condenser lens 26 converges the parallel light beams, thereby to provide one light beam.

Figure 6:
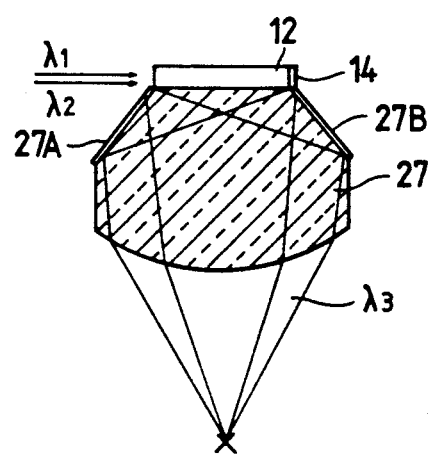

The fifth embodiment of FIG. 6 is featured in that a couple of total reflection mirrors 27A and 27B are integral with a condensing member 27. The condensing member 27 shaped like a condensing lens may be part of the substrate 10 worked into a condensing lens.

The total reflection mirrors 27A and 27B may be replaced by metal films or dielectric multi-layer films that are deposited on corresponding locations of the condensing member 27.

A sixth embodiment of a wavelength converting device according to the present invention shown in FIG. 7 will be described.

This embodiment uses a ring-like light waveguide which is constructed by coupling three linear light waveguides 12A to 12C in a regular triangle fashion. Two total reflection mirrors 14A and 14B are contained in the triangle. A substrate 10A and the light waveguides 12A to 12C on the substrate 10A are shaped into a regular triangle whose vertices are chamfered. The total reflection mirrors 14A and 14B are placed on the two chamfered faces of the light waveguide. An antireflection coating (referred to as AR coating) 15 is applied to the remaining chamfered face of the light waveguide.

When light and $\lambda_1$ light and $\lambda_2$ are incident on the chamfered face coated with the AR coating 15, $\lambda_3$ light as the Cherenkov light is output from the underside of the two total reflection mirrors 14A and 14B and one AR coating 15.

In this embodiment, the substantial interactive length is tripled, providing high wavelength conversion efficiency.

Figure 7:
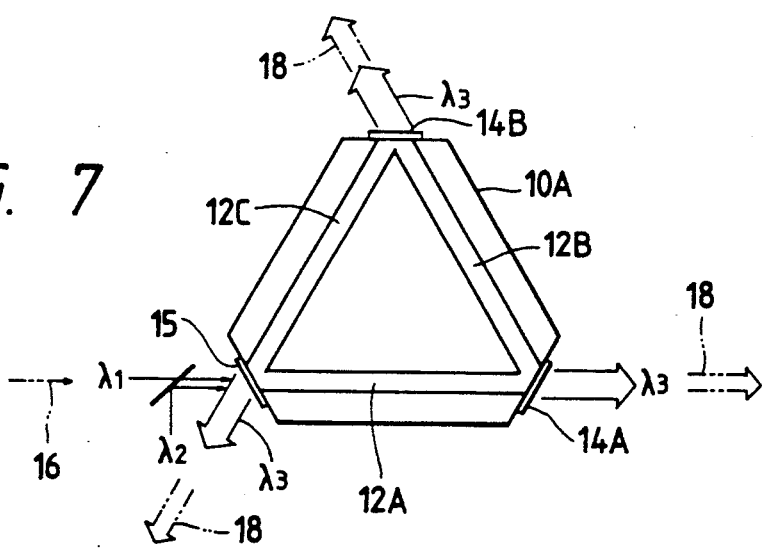
FIGS. 7 to 11 are plan views showing sixth to tenth embodiments of the present invention.

A light beam 16 may be incident on the device in the manner similar to the first embodiment so that SHG light beams 18 are output, as shown by an alternate long and two short dashes line in FIG. 7.

Figure 8:
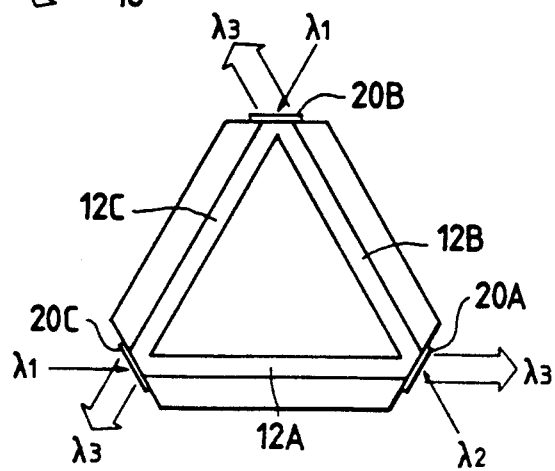

While, in the sixth embodiment of FIG. 7, the $\lambda_1$ light and $\lambda_2$ light are simultaneously applied to one location of the ring-like light waveguide, these light beams may be applied to different locations, as in a seventh embodiment shown in FIG. 8.

The seventh embodiment, unlike the sixth embodiment of FIG. 7, uses dielectric multi-layer mirrors 20A to 20C, which are respectively formed on the chamfered faces of the ring-like light waveguide. The mirror 20A transmits the $\lambda_2$ light and reflects the light. The mirrors 20B and 20C reflect the $\lambda_2$ light and transmit the $\lambda_1$ light.

In this embodiment, the $\lambda_2$ light enters the light waveguide 12B through the mirror 20A at the incident angle of 30°. The value of 30° is used here for convenience of explanation. It is necessary, in the strict sense, that the incident angle be determined in accordance with the Snell's law so as to efficiently introduce light into the waveguide. The $\lambda_1$ light enters the light waveguides 12C and 12A respectively through the mirrors 20B and 20C at the same incident angle. The device thus arranged constitutes a system in which the $\lambda_2$ light under measurement is converted to the $\lambda_3$ light by using the pumping light of $\lambda_1$.

Since the pumping light of wavelength $\lambda_1$ can be input to the ring-like light waveguide from the two locations, the wavelength can effectively be converted. The $\lambda_3$ light as the converted light can be output from three portions at the same time.

In order to obtain the $\lambda_3$ light from the device along one direction in the sixth and seventh embodiments, the combination of the total reflection mirrors and the condensing lens is used as in the fourth or fifth embodiment of FIG. 5 or 6.

Figure 17:
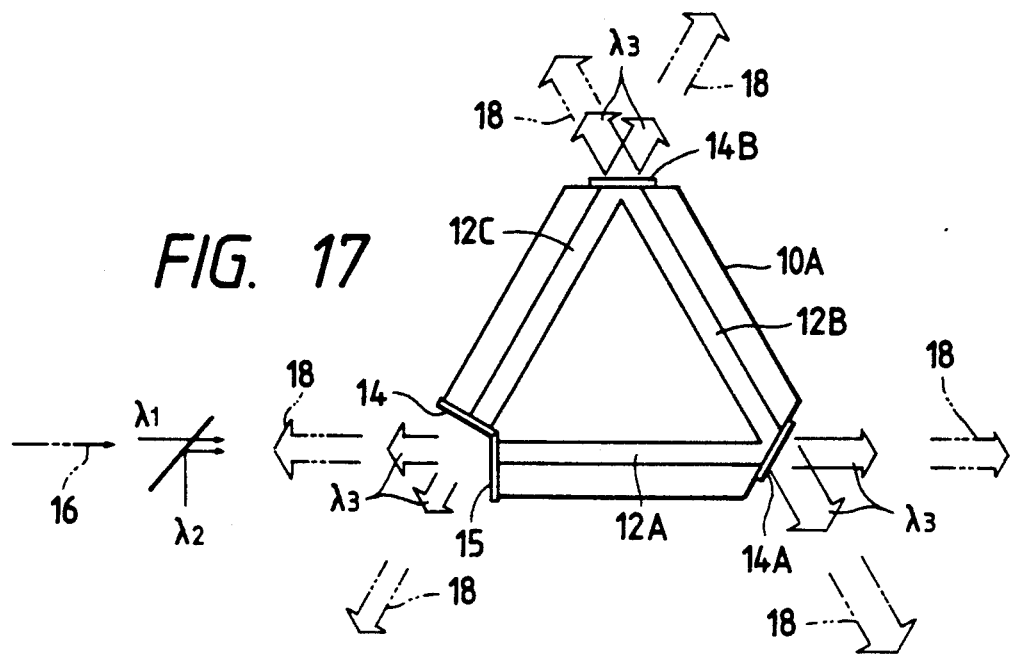
FIG. 17 is a plan view showing a modification of the sixth and seventh embodiments.

As a modification of the sixth or seventh embodiment, a total reflection mirror 14 may be provided at the terminal end of the ring-like light waveguide, as shown in FIG. 17. This modification can also produce both the SHG light and sum/difference frequency light.

Figure 9:
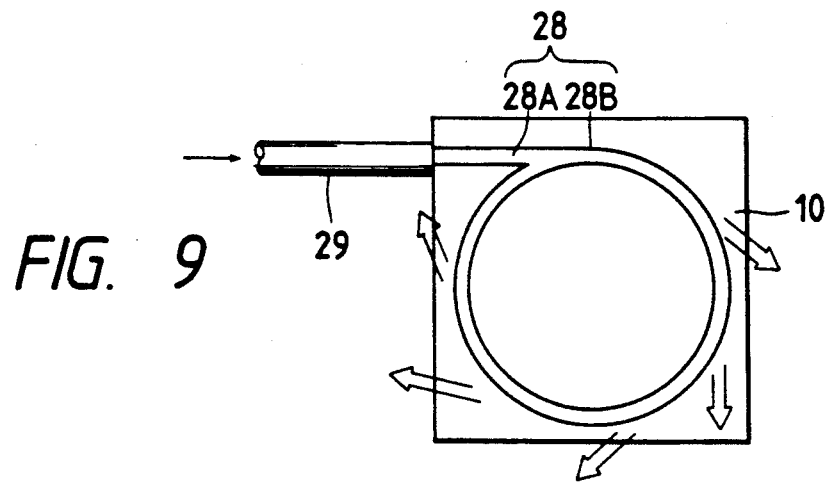

An eighth embodiment of the present invention shown in FIG. 9 will be described.

In the eighth embodiment, a light waveguide 28 includes a linear light introducing portion 28A and a circular light waveguide portion 28B smoothly connected to the former. An optical fiber 29 is coupled with the end of the light introducing portion 28A. Incident light is led from the optical fiber 29 to the light introducing portion 28A.

In this embodiment, the substantial interactive length is infinite, thereby providing wavelength conversion of high efficiency.

Figure 10:
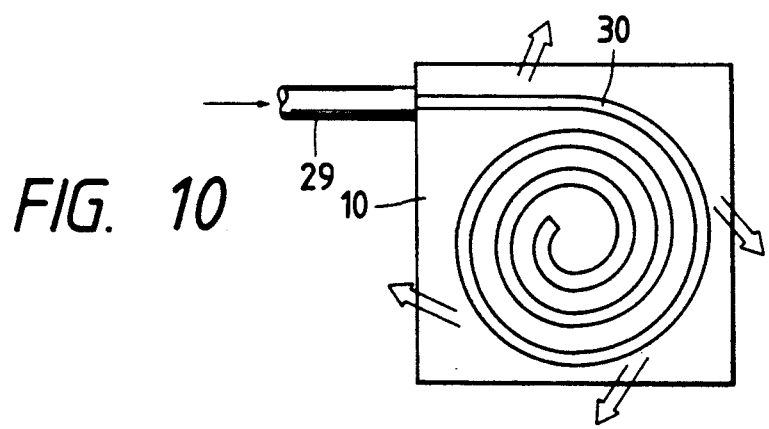

A ninth embodiment of the present invention shown in FIG. 10 will be described.

In the ninth embodiment, a light waveguide 30 is shaped in a spiral fashion.

Also in the present embodiment, the light waveguide 30 can be elongated without increasing the device area. Therefore, the interactive length is increased and the wavelength conversion efficiency is improved.

Figure 11:
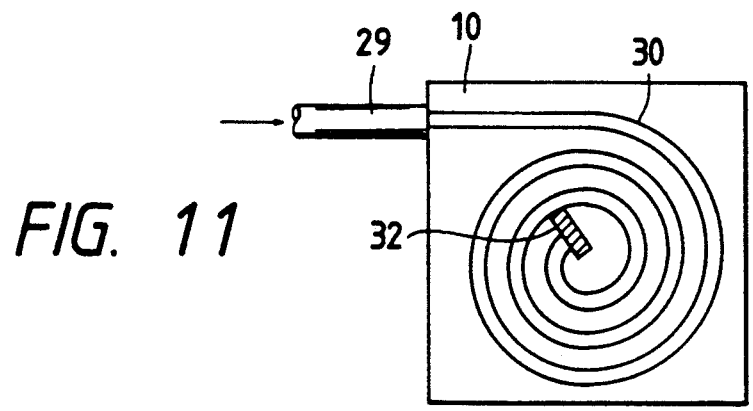

A total reflection mirror 32 may be provided at the end of the spiral light waveguide, as in a tenth embodiment shown in FIG. 11. Provision of the mirror 32 further elongates the interactive length, and therefore further improves the wavelength conversion efficiency.

In the eighth to tenth embodiments, in order to obtain the converted light along one direction, the combination of the total reflection mirror and the condensing lens is used as shown in FIGS. 5 and 6. In this case, however, it is necessary to use a total reflection mirror shaped like a circular cone so as to reflect all of the output light beams.

In the embodiments of FIGS. 2 to 4, and FIGS. 7 and 8, the $\lambda_1$ light and the $\lambda_2$ light are introduced from one location or different locations of the light waveguide, in order to obtain the light of a sum/difference frequency. In the case where those light beams are introduced from the single location of the light waveguide, a dichroic mirror is required.

Embodiments to follow are capable of producing sum/difference frequency light in response to the $\lambda_1$ light and the $\lambda_2$ light incident on the light waveguide, without using a dichroic mirror.

An eleventh embodiment of the present invention shown in FIG. 12 will be described.

In the eleventh embodiment, a light waveguide 34 shaped like Y consists of two light introducing portions 34A and 34A which are partially parallel to each other, a junction part 34B at which the two inroducing portions 34A are smoothly joined together and a single linear light generating portion 34C connected to the junction part 34B. Optical fibers 36A and 36B are coaxially coupled with the light introducing portions 34A and 34B, respectively, and lead the $\lambda_1$ light and the $\lambda_2$ light to those light introducing portions, respectively.

In the instant embodiment, the incident light beams of wavelengths $\lambda_1$ and $\lambda_2$ are input through the optical fibers 36A and 36B, travel as guided light through the introducing portions 34A and 34B, and are combined into a single beam of light at the junction part 34B. Then, the light generating portion 34C generates output light of $\lambda_3$ as Cherenkov light.

The two light introducing portions 34A and 34A join together at the junction part 34B. Since those two light introducing portions are combined to form a small angle therebetween, the light beams are attenuated little or scattered when those meet. Therefore, the light beams of wavelengths $\lambda_1$ and $\lambda_2$ can effectively be introduced to the light generating portion 34C, producing the intense output light of $\lambda_3$.

It is noted that in the present embodiment, there is no need of using a wave combining means such as a dichroic mirror before introduction of the light beams of wavelengths $\lambda_1$ and $\lambda_2$ into the light waveguide 34. This feature realizes the reduction of the device size. In the conventional device, to input the light beams of wavelengths $\lambda_1$ and $\lambda_2$ by the optical fibers, output light beams from the optical fibers are first collimated by objectives, combined together, and then again converged by an objective. In the present embodiment, on the other hand, there is no need for such an intricate process.

Figure 12:
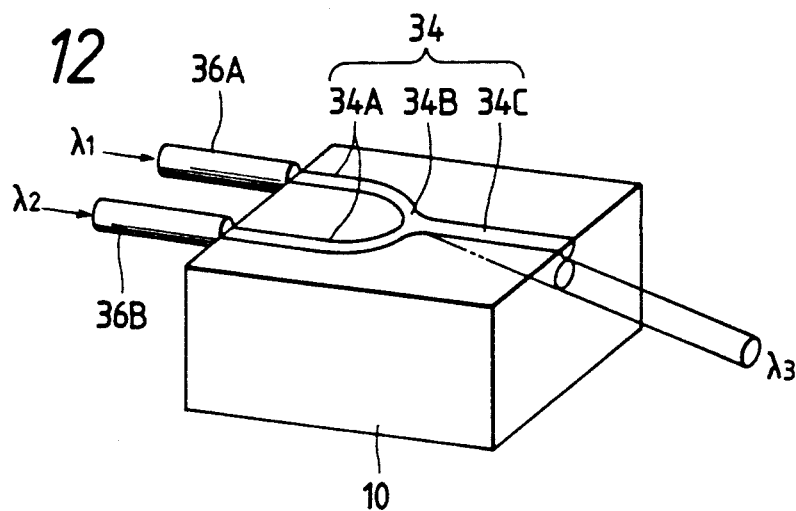
FIG. 12 is a perspective view showing an eleventh embodiment of the present invention.
Figure 13:
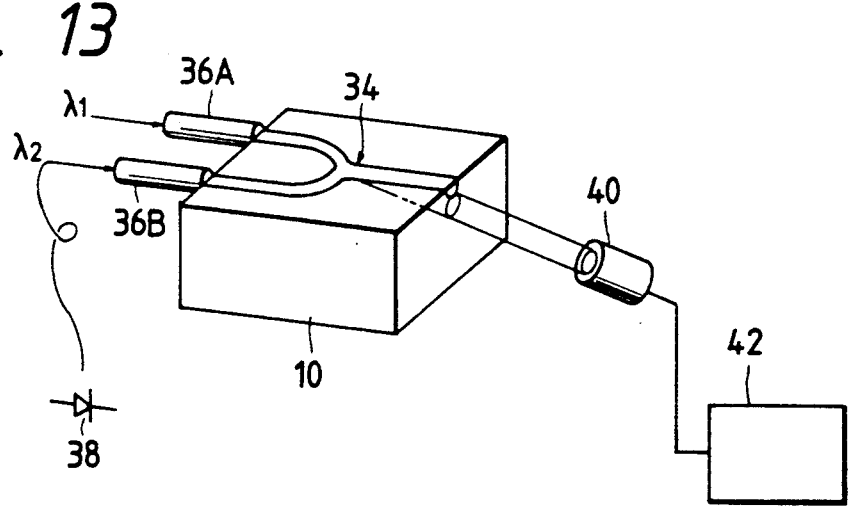
FIG. 13 is a perspective view, partially a block diagram, showing a twelfth embodiment of the present invention.

FIG. 13 shows an embodiment in which the eleventh embodiment of FIG. 12 is applied to an infrared light detector.

In this case, light under measurement having wavelength $\lambda_1$ of 1.55 $\mu$m is introduced through an optical fiber 36A. Pumping light having wavelength $\lambda_2$ of 0.85 $\mu$m, which is generated by a semiconductor laser 38, is introduced through an optical fiber 36B.

A sum frequency light ($\lambda_3 = 0.55$ $\mu$m), which is generated by the light generating poriton 34C as Cherenkov light, is received by a photomultiplier tube 40 and processed by a signal processor 42, which produces a measured value. A wavelength conversion efficiency in the light waveguide 34 is approximately 1% for 40 mW of the output power of the pumping light.

The above infrared light detector is 100 times more sensitive than the detector where the light under measurement ($\lambda_1 = 1.55$ $\mu$m) is directly detected by the photomultiplier tube 40. The reason for this is as follows: A sensitivity of the photomultiplier tube 40 to the $\lambda_3$ light is 10,000 times higher than that to the $\lambda_1$ light. Since the conversion efficiency for the $\lambda_3$ light is 1%, the sensitivity of the above infrared light detector is 100 times higher than that of the detector where the $\lambda_1$ light is directly measured.

If the $\lambda_2$ light as the pumping light is pulse light, the $\lambda_3$ light is equivalent to light which would be obtained by sampling the $\lambda_1$ light by the pumping light.

In this case, if a timing of the $\lambda_2$ light is gradually shifted with respect to the light, an optical sampling oscilloscope is realized.

A time resolution of the oscilloscope depends on a pulse width of the $\lambda_2$ light, not the capability of the photomultiplier tube 40. Therefore, the time resolution of 1 ps or less can readily be realized.

Figure 14:
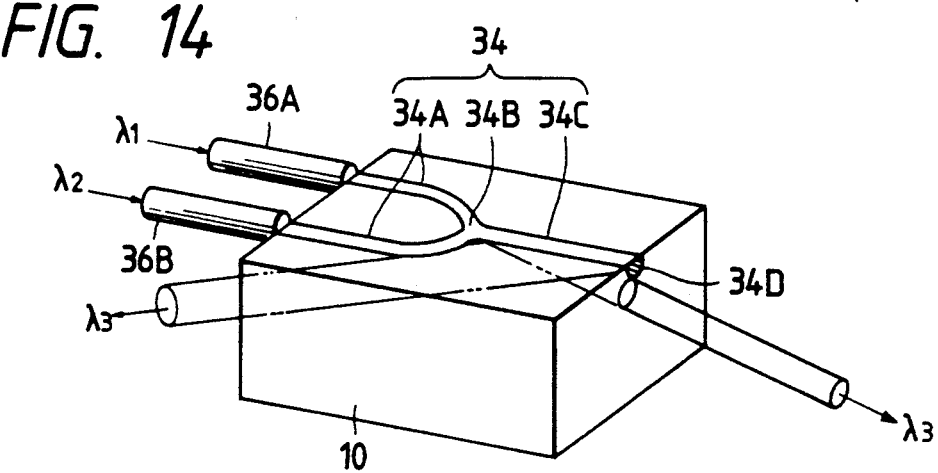
FIG. 14 to 16 are perspective views showing thirteenth to fifteenth embodiments of the present invention.

A thirteenth embodiment of the present invention shown in FIG. 14 will be described.

In this embodiment, a reflecting mirror 34D is provided at the end of the light generating portion 34C, which is at the side opposite to the light introducing portions 34A (see the eleventh embodiment). The reflecting mirror 34D may be a total reflection mirror of a metal-deposited film or a dielectric multi-layer mirror.

In the thirteenth embodiment, sum/difference frequency light can also be obtained from the guided light after the reflection by the reflecting mirror 34D. Therefore, the substantial interactive length can be doubled, improving the conversion efficiency of the light.

Figure 15:
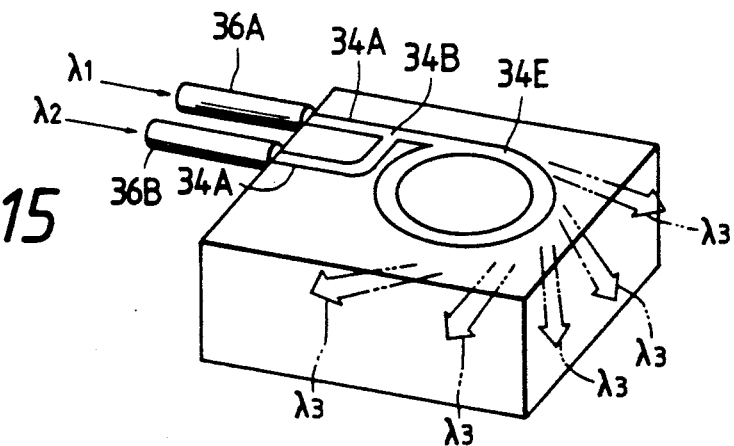

A fourteenth embodiment of the present invention shown in FIG. 15 will be described.

In this embodiment, a circular light generating portion 34E is used in place of the linear light generating portion 34C in the eleventh embodiment of FIG. 12.

Since, in this embodiment, the substantial interactive length of the light generating portion 34E is infinite, high efficiency wavelength conversion is realized. Furthermore, since the light generating portion 34E is circular, the $\lambda_3$ light as output light can be obtained in every direction.

Figure 16:
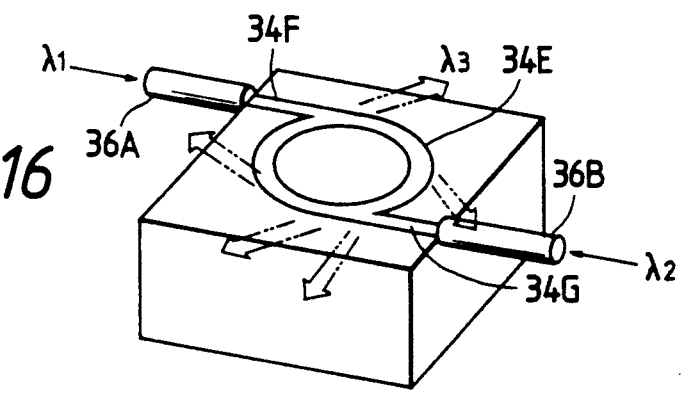

A fifteenth embodiment of the present invention shown in FIG. 16 will be described.

The fifteenth embodiment is arranged such that a pair of linear light introducing portions 34F and 34G, which are parallel to each other, are tangentially coupled with a circular light generating portion 34E at the opposite positions. Optical fibers 36A and 36B for introducing the $\lambda_1$ and $\lambda_2$ light beams are respectively coupled with the linear light introducing portions 34F and 34G.

In the fifteenth embodiment, there is no need of combining the two introducing portions. In this respect, the construction of the light waveguide is simpler than that of the fourteenth embodiment.

Further, the linear light introducing portions 34F and 34G may be coupled with the circular light generating portion 34E tangentially in any desired direction. Accordingly, a freedom in coupling the optical fibers 36A and 36B with the device is improved.

In the thirteenth to fifteenth embodiments, when it is desired to obtain the wavelength-converted light along one direction, the combination of a circular cone total reflection mirror and a condenser lens is for example used as in the eighth to tenth embodiment.

In the foregoing embodiments of the sum/difference frequency generating device with such a structure that the $\lambda_1$ and $\lambda_2$ light beams are introduced from the optical fibers through the light introducing portions to the light generating portion, the light generating portion is shaped linear or circular. Instead, the light generating portion may be a spiral as shown in FIG. 10, or a spiral having a reflecting mirror at the end, as shown in FIG. 11. Further, it may be a ring-like light waveguide, as shown in FIG. 7 or 8.

The light generating portion, which is shaped triangular, circular, or spiral in each embodiment as mentioned above, may take any form, as long as it allows the substantial interactive length to become longer and does not need an increased device area.

As seen from the foregoing description, the wavelength converting device according to the present invention can increase the substantial interactive length without increasing the device size, thereby improving the conversion efficiency of the wavelength of light.

The light waveguide can be constructed with the light introducing portion and a curved light waveguide which is smoothly coupled with the light introducing portion. With this construction, the interactive length is further elongated, in spite of the small device size. This results in further improvement of the conversion efficiency.

When the wavelength converting device is used as a sum/difference frequency generating device, light beams may be led to a light generating portion through two light introducing portions. Therefore, there is no need for using a wave combining means such as a dichroic mirror. Further, the light beams can be introduced directly from optical fibers. These are other superior advantages.

The above description is devoted to the Cerenkov radiation type wavelength converting device. The present invention is not limited to such a case, but applicable to another type of wavelength converting device which performs phase matching and can produce output light in a direction different from an input light direction.

What is claimed is:

1. A wavelength converting device comprising:
   a substrate;
   a light waveguide of nonlinear optical material on said substrate, comprising means for introducing light in said light waveguide to generate Cerenkov radiation in said substrate; and
   reflecting means provided at least one end face of said light waveguide, for reflecting a guided light beam back through said light waveguide.

2. A wavelength converting device according to claim 1, wherein said light waveguide is substantially straight and has at least two end faces, and said reflecting means is provided at least at one of said at least two end faces of said light waveguide.

3. A wavelength converting device according to claim 1, wherein said light waveguide is a ring-like light waveguide including a plurality of light waveguides coupled one to another by said reflecting means.

4. A wavelength converting device according to claim 1, wherein said light waveguide has a generally Y-shaped structure including two light introducing portions partially parallel to each other, a junction part at which said two light introducing portions are smoothly joined together, and a linear light generating portion coupled with said junction part, and said reflecting means is disposed at an end face of said light generating portion.

5. A wavelength converting device according to claim 1, wherein said reflecting means is a total reflection mirror.

6. A wavelength converting device according to claim 1, wherein said reflecting means is a dielectric multi-layer mirror.

7. A wavelength converting device according to claim 1, wherein said device operates as an SHG light generating device.

8. A wavelength converting device according to claim 1, wherein said device operates as a sum and difference frequency generating device.

9. A wavelength converting device according to claim 1, further comprising directing means for directing wavelength-converted output light beams to one direction.

10. A wavelength converting device according to claim 9, wherein said directing means comprises mirror means for reflecting said output light beams toward lens means, and said lens means for focusing said output light beams on one point.

11. A wavelength converting device comprising:
    a substrate;
    a light waveguide of nonlinear optical material on said substrate, comprising means for introducing light in said light waveguide to generate Cerenkov radiation in said substrate; and
    a light introducing portion and a curved light waveguide smoothly coupled with said light introducing portion.

12. A wavelength converting device according to claim 11, wherein said curved light waveguide has the shape of a closed circle.

13. A wavelength converting device according to claim 11, wherein said curved light waveguide is spiral in shape.

14. A wavelength converting device according to claim 13, further comprising reflecting means provided at an end face of said spiral light waveguide located opposite to said light introducing portion, for reflecting a guided light beam back to said spiral light waveguide.

15. A wavelength converting device according to claim 11, wherein said device comprises a plurality of said light introducing portions, each smoothly coupled with said curved light waveguide.

16. A wavelength converting device according to claim 15, wherein said light introducing portion is tangentially connected to said curved light waveguide at least at each connecting point of a curved portion of said curved light waveguide.

17. A wavelength converting device according to claim 11, wherein said light introducing portion has a generally Y-shaped structure including two sub-introducing portions partially parallel to each other, a junction part at which said two sub-introducing portions are smoothly joined together, and a connecting portion one end of which is coupled with said junction part and the other end of which is tangentially connected to said curved light waveguide.

18. A wavelength converting device according to claim 11, further comprising an optical fiber coupled with an input end of said light introducing portion, for introducing an input light beam into said light introducing portion.

19. A wavelength converting device according to claim 11, further comprising directing means for directing wavelength-converted output light beams to one direction.

20. A wavelength converting device according to claim 19, wherein said directing means comprising mirror means for reflecting said output light beams toward lens means, and said lens means for focusing said output light beams on one point.

21. A wavelength converting device comprising:
a substrate;
a light waveguide of nonlinear optical material on said substrate, comprising means for introducing light in said light waveguide to generate Cerenkov radiation in said substrate, said light waveguide having a generally Y-shaped structure including two light introducing portions, a junction part at which said two light introducing portions are smoothly joined together, and a substantially straight light generating portion coupled with said junction part.

22. A wavelength converting device according to claim 21, further comprising two optical fibers respectively coupled with input ends of said two light introducing portions, for introducing input light beams into said light introducing portions.

23. A wavelength converting device according to claim 21, further comprising directing means for directing wavelength-converted output light beams to one direction.

24. A wavelength converting device according to claim 23, wherein said directing means comprising mirror means for reflecting said output light beams toward lens means, and said lens means for focusing said output light beams on one point.

* * * * *